United States Patent [19]

Jackson et al.

[11] Patent Number: 4,642,458

[45] Date of Patent: Feb. 10, 1987

[54] POLARIMETRIC FIBRE SENSOR

[75] Inventors: David A. Jackson, Canterbury, England; Michael Corke, Wheaton, Ill.; Alan D. Kersey, Washington, D.C.

[73] Assignee: Kent Scientific and Industrial Projects Limited, Kent, England

[21] Appl. No.: 774,589

[22] PCT Filed: Jan. 18, 1985

[86] PCT No.: PCT/GB85/00017

§ 371 Date: Sep. 5, 1985

§ 102(e) Date: Sep. 5, 1985

[87] PCT Pub. No.: WO85/03124

PCT Pub. Date: Jul. 18, 1985

[51] Int. Cl.[4] .............................................. G02F 1/01
[52] U.S. Cl. .................................... 250/225; 250/227
[58] Field of Search ................. 73/800; 250/225, 227, 250/231 R; 350/96.15, 96.29; 374/161

[56] References Cited

U.S. PATENT DOCUMENTS 4,405,198 9/1983 Taylor ............................. 350/96.29
4,554,449 11/1985 Taniuchi et al. ............. 350/96.29 X Primary Examiner—Eugene R. LeRoche
Assistant Examiner—James C. Lee
Attorney, Agent, or Firm—Bell, Seltzer, Park & Gibson

[57] ABSTRACT

A polarmetric fiber sensor comprises a lead fiber (1) and a shorter length of sensing fiber (2). Both fibers comprise higly birefringent optical fiber having orthogonal eigen modes and are spliced together with their eigen modes mutually rotated by 45°. The sensing fiber (2) has a reflective distal end (6). Linearly polarized light from a laser source (3) is launched into one mode of the lead fiber (1) and light reflected from the distal end of the sensing fiber is recovered from the other mode of the lead fiber via a beam splitter (7) and photodiode (8). The resulting electrical signal produced by the photodiode (8) corresponds to the modal birefringence of the sensing fiber (2) and changes in this birefringence are monitored by processing means (9) to detect changes in a physical parameter sensed by the sensing fiber.

7 Claims, 2 Drawing Figures

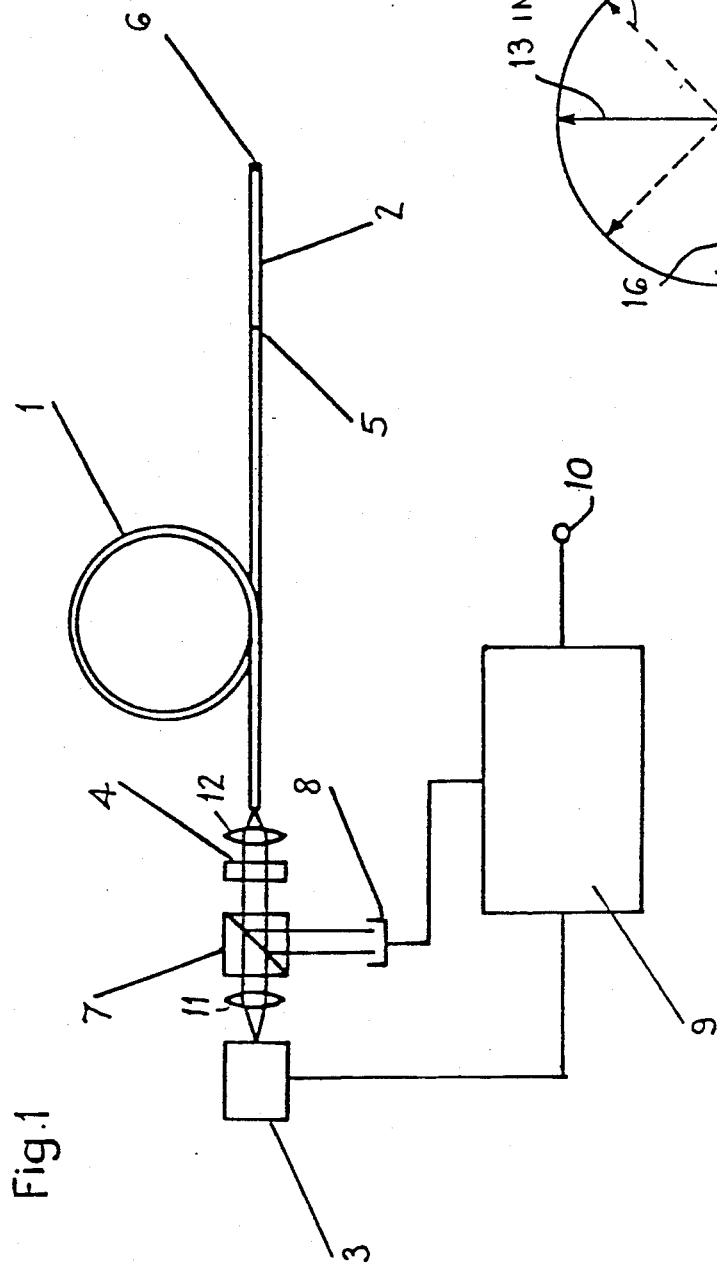

POLARIMETRIC FIBRE SENSOR

The present invention relates to an optical fibre sensing apparatus or polarimetric fibre sensor and, more particularly, to such apparatus which utilises the relative change in optical path lengths of the two orthogonal polarisation eigen modes of a highly birefringent optical fibre to monitor variations in physical parameters, such as temperature and strain. The invention is particularly suitable for remotely monitoring large range physical variations resulting in changes in sensing fibre length of the order of 0.003 μm to greater than 100 μm.

The development of polarisation preserving monomode optical fibres has enabled the development of coherent optical fibre systems in which co-linearity of mixed optical beams is required. Futhermore, a variety of optical sensors, which utilise the interference between the orthogonally polarised modes of stress-induced highly birefringent fibres, have been proposed. In such applications, both eigen or polarisation modes of the fibre are excited. Physical perturbations of the fibre, for example, temperature change or axial strain, vary its physical parameters, such as, length and/or refractive index and, hence, the level of intrinsic birefringence, which leads to a change in the state of polarisation of the light at the fibre output, which, in turn, can be detected using a polarisation analyser. This forms the basis of a number of simple polarimetric fibre sensors. A major problem with sensors of this type is that all the fibre acts as the sensor, including the input and output signal leads. This limits the application of this type of sensor. Moreover, most systems proposed have been for small-frequency signals and therefore require refinement if they are to operate over large dynamic ranges with an unambiguous output.

An object of the present invention is to provide an optical fibre sensing apparatus in which the change in modal birefringence of a short length of birefringent optical fibre is monitored in order to measure changes in a physical parameter sensed by the fibre. Another object is to provide such an apparatus which utilises both the polarisation-preserving property and the wavelength dependence of the intrinsic birefringence of stress-induced highly birefringent fibre to achieve remote monitoring of large range environmentally induced changes in the birefringence of a short length of sensing fibre.

The present invention consists in optical fibre sensing apparatus characterised by:

(a) an optical fibre lead spliced to a shorter optical sensing fibre, (b) said lead and sensing fibres comprising birefringent optical fibres having substantially orthogonal eigen modes and being spliced together with their eigen modes mutually rotated by substantially 45°, (c) a reflective surface disposed at the distal end of the sensing fibre, (d) light source means for propagating linearly polarised incident light along one of the eigen modes of the lead fibre, whereby light beams are propagated along both eigen modes of the sensing fibre and are reflected from the distal end of the sensing fibre to propagate return light beams along both eigen modes of the lead fibre, (e) recovery means for recovering one of the returning light beams from the lead fibre and producing an electrical signal corresponding to modal birefringence of the sensing fibre, and (f) means for processing the electrical signal and producing an output signal corresponding to the polarisation mode delay of the sensing fibre.

With the present invention, physically induced changes in the modal birefringence of the relatively short length of sensing element or fibre are monitored in reflection through the lead fibre, which may be of any required length subject to the transmitted and reflected light beams not being unduly attenuated. Exciting only one of the eigen modes of the lead fibre ensures that the system displays down lead insensitivity to any induced change in modal birefringence in the lead fibre. This lack of sensitivity is due to the effective polarisation isolation of the light, which is launched into only one of the eigen modes, as it propogates down the lead fibre. Preferably, the lead and sensing fibre is polarisation-preserving, highly birefringent fibre such as that commonly referred to as bow-tie fibre.

In one preferred embodiment, linearly polarised light from a single freqeuncy laser light source is launched exactly into one of the eigen modes of the lead fibre. The length of sensing fibre, which is identical to the lead fibre, is fusion spliced onto the lead fibre so that its polarisation axes are rotated by approximately 45° with respect to those of the lead fibre. Thus, at the splice, both of the eigen modes of the sensing fibre are equally excited by the linearly polarised beam at 45° to each of them. After reflection from the distal end of the sensing fibre and upon return to the splice, there exists a phase delay $\psi$ between the two linear polarisation modes, where $\psi$ is a measure of the modal retardance in the sensing fibre. Therefore, in general, recombination of the two modes at the splice produce eliptically polarised light in which the state of polarisation is determined by the modal retardance $\psi$ and this light is propagated in both modes of the lead fibre. Provided the above input condition can be maintained, only changes in birefringence occurring in the sensing fibre contribute to the back reflected light in the orthogonal state to that of the incident beam; thus the system provides lead insensitivity.

Conveniently, this change in modal birefringence of the sensing fibre is monitored by utilising, as a polarisation analyser, the polarisation mode of the lead fibre not utilised for the incident light beam. A polarising beam splitter and photodiode may be used to recover the reflected light signal from the lead fibre. The output signal from the photodetector is at maximum when $\psi = (2N+1)\pi$ and a minimum when $\psi = 2N\pi$.

In one simple form of apparatus according to the invention, a fringe counting technique may be adopted to determine the physical change being monitored. However, this technique suffers from the disadvantage that no directionality is obtained and thus ambiguity may arise when a change occurs. One of several different signal processing techniques may be adopted so as to overcome this disadvantage. One technique is to reduce the sensing length of the sensing fibre so that a greater change in physical parameter is required to produce a $2\pi$ phase change in the modal birefringence, thereby affording the sensor an unambiguous range with it just operating up and down the side of one fringe.

However, in order to extend the operational range of the apparatus according to the invention, it must be possible continuously to track and retain the exact value of the polarisation modal phase delay which occurs in the sensing fibre. A heterodyne-type detection system is suitable for this purpose and by utilising a laser diode switching scheme, heterodyne detection may be employed. A heterodyne detection system not only overcomes the tracking range problem but also the sensitivity problem created by the requirement that the system be operated at quadrature to maintain constant signal sensitivity.

Hence, according to a feature of the invention, the sensing apparatus includes a heterodyne signal detection or recovery system which provides an output carrier signal, the relative phase of which is directly related to the polarisation mode phase delay $\psi$. This signal processing provides constant small-signal sensitivity and a practically infinite phase-tracking range. The system may utilise the wavelength dependence of $\beta$, the linear birefringence of the fibre ($\beta = 2\pi/L_p$ where $L_p$ is the fibre beat length) sequentially to obtain outputs which contain quadrature components of the modal phase delay, $\psi = \beta L$, where L is the length of the fibre (the sensing region can be much shorter than L). These quadrature components vary as $\sin \psi$ and $\cos \psi$ and therefore allow $\psi$ to be tracked continuously.

The wavelength of the light source is switched by $\Delta \lambda = \lambda_1 - \lambda_2$ to produce outputs of the form $(1 + \cos \psi)$ and $[1 + \cos (\psi + \Delta \psi)]$, where the change in polarisation mode phase delay, $\Delta \psi$ corresponding to the change in length $\Delta \lambda$ can be expressed as $$\Delta \psi = 2\pi \cdot \Delta l \cdot \frac{\Delta \lambda}{\lambda^2} = 2\pi \frac{L}{L_p} \frac{\Delta \lambda}{\lambda} \quad (1)$$

where $\Delta l = L \cdot \lambda/L_p$ is the effective modal optical path length difference at $\lambda_1$ and $\lambda_2$ and $\lambda_1 \approx \lambda_2 \approx \lambda$. For $\Delta \psi = (N + \frac{1}{2})\pi$ the outputs at each wavelength vary as $(1 + \cos \psi)$ and $(1 + \sin \psi)$.

This condition is satisfied for sensing fibre lengths given by:

$$L = (2N+1)(L_p \lambda / 4\Delta \lambda). \quad (2)$$

The output signals of the sensor are combined in antiphase with DC components to produce the $\sin \psi$ and $\cos \psi$ terms. These signals are then multiplied by quadrature components of a local oscillator (the LO frequency is directly related to the switching rate of the light source) yielding signals of the form $\sin \Omega_c t \cos \psi$ and $\cos \Omega_c t \sin \psi$. These signals are then differentially combined to form the final signal $\sin (\Omega_c t - \psi)$ which represents a carrier of constant amplitude and relative phase euqal to the polarisation mode delay of the sensing fibre. Final demodulisation of this output signal may be accomplished using either conventional FM or carrier phase tracking techniques which produce both the instantaneous value of any differential high frequency phase components and a total differential phase excursion of the sensing fibre.

The apparatus according to the invention is particularly suitable for remotely monitoring physical changes and may have a high sensitivity and good lead insensitivity. It is of simple structure and may be applied, for example, in thermometry in noise or hazardous environments such as are found in jet engines, power stations, nuclear reactors and transformers, which do not require the high resolution measurement of temperature.

In order that the invention may be more readily understood, reference will now be made to the accompanying drawings, in which:

FIG. 1 is a diagrammatic illustration of remote polarimetric sensing apparatus constructed in accordance with the invention, and FIG. 2 illustrates the relative orientations of the polarisation axes or eigen modes of the lead and sensing fibres.

Referring to the drawings, the sensing apparatus comprises an optical fibre lead 1 and a shorter optical fibre sensing element 2. For example, the lead 1 may be 90 meters long and the sensing element 30 cms. The lead and sensing fibres are made from identical polarisation-preserving, stress-induced, highly birefringent optical fibre such as commercially available bow-tie fibre. The lead fibre is fusion spliced at 5 to the sensing fibre so that the polarisation axes of the two fibres are rotated at 45° with respect to one another (see FIG. 2). Light for the apparatus is supplied by a linearly polarised laser source 3 which is alternately energised at two different current levels, under the control of the processing electronics 9, to supply incident light at two different wavelengths $\lambda_1$ and $\lambda_2$. Equal levels of the linearly polarised light at the two different wavelenths are alternately launched into the proximal end of the lead fibre 1 through a collimating lens 11, a polarising beam splitter 7 a half-wave plate 4 and a second collimating lens 12. The half-wave plate 4 is arranged to rotate the polarisation direction of the incident beam until it exactly coincides with one of the eigen modes of the lead fibre 1.

The distal end 6 of the sensing fibre 2 is coated or silvered with a highly reflecting deposit and the light reflected from the silvered distal end of the sensing fibre is recovered via the polarising beam splitter 7 which projects the recovered light onto a photodiode 8 having its output connected to signal processing electronics 9.

In use, the sensing fibre 2 is suitably arranged to monitor change in a physical parameter, such as temeprature or strain. For example, for the purposes of measuring the changes in temperature in a chamber, a portion of the sensing fibre 2 is disposed within the chamber. For measuring dimensional changes, a portion of the sensing fibre 2 is suitably coupled or fixed to a part whose linear change is to be measured.

Linearly polarised light at the two different wavelengths $\lambda_1$ and $\lambda_2$ is alternately launched in a timed sequence into the proximal end of the lead fibre 1 and, by reason of the arrangement of the half-wave plate 4 excite only one of the eigen modes of the mode fibre, that is the input mode 13 in FIG. 2. Each incident light beam propagates through the lead fibre 1 without any change in its polarisation properties and, when it reaches the fibre splice 5, it equally excites both of the eigen modes 14, 15 of the sensing fibre 2 as the axes of its orthogonal modes are ±45° to those of the lead fibre. The two resulting light beams propagate through the sensing fibre and the birefringence creates a phase delay between these two beams. At the distal end 6 of the sensing fibre both beams are reflected back towards their origin. The phase difference $\psi$ between the two beams is effectively doubled, because the beams traverse the sensing fibre twice, so that the phase differences in each direction are additive.

The two reflected beams in the sensing fibre are recombined at the splice 5 to produce eliptically polarised light and both eigen modes 13,16 of the lead fibre 1, which serves both as an input and output fibre, are now excited. Changes in the birefringence of the sensing fibre 2 may be determined by monitoring the intensity of either of the returning beams. In practice, the eigen mode 16 of the lead fibre which is unused for the incident light is selected for detection of the output beam, as this state can be uniquely selected by the polarising beam splitter 7 incorporated in the beam launching optics. The level of the light power returned through this eigen is sensed by the photodiode 8 and the resulting electrical output signal varies in a sinusoidal manner, being a maximum when $\psi$, the birefringence, is equal to $(2N+1)\pi$ and a minimum when $\psi=2N\pi$. This output signal is fed to the signal processing electronics 9 which are designed to overcome the ambiguity of the sinusoidal output. To this end, the signal processing electronics 9 utilises the wavelength dependence of $\beta$ of the linear birefringence of the fibre $(\beta=2\pi/L_p)$ were $L_p$ is the fibre beat length to sequentially obtain outputs which contain quadrature components of the modal phase delay, and $\psi=\beta L$ where L is the length of the 'sensing' fibre. These quadrature components vary as sin $\psi$ and cos $\psi$ and therefore allow the phase information $\psi$ to be recovered uniquely.

The principle of operation of the signal processing electronics is as follows. The wavelength of the source light is switched by $\Delta\lambda=\lambda_1-\lambda_2$ to produce outputs of the form $[1+\cos \psi]$ and $[1+\cos (\psi+\Delta\psi)]$, where the change in polarisation mode phase delay, $\Delta\psi$, corresponding to the change in wavelength, $\Delta\lambda$, can be expressed as $$\Delta\psi = 2\pi \cdot \Delta l \cdot \frac{\Delta\lambda}{\lambda^2} = 2\pi \frac{L}{L_p} \frac{\Delta\lambda}{\lambda} \quad (1)$$

where $\Delta l = L./L_p$ is the effective modal optical path length difference at $\lambda_1$ and $\lambda_2$ and $\lambda_1 \approx \lambda_2 \approx \lambda$. For $\Delta\psi=(N+\frac{1}{2})\pi$ the outputs at each wavelength vary as $[1+\cos \psi]$ and $[1+\sin \psi]$. This condition is satisfied for fibre lengths given by:

$$L=(2N+1)(L_p\lambda/4\Delta\lambda) \quad (2)$$

The DC components of the output signals of the sensor are nulled to produce the sin $\psi$ and cos $\psi$ terms, these signals are then multiplied by quadrature components of a local oscillator yielding signals of the form sin $\Omega_c t$ cos $\psi$ and cos $\Omega_c t$ sin $\psi$. These signals are then differentially combined to form the final output signal at 10, sin $(\Omega_c t - \psi)$, which represents a carrier of constant amplitude and relative phase equal to the polarisation mode delay of the sensing fibre 2. Final demodulation of this output signal can be accomplished using either conventional FM or carrier phase tracking techniques which will yield both the instantaneous value of any AC modal phase components and the total DC modal phase excursion of the sensing fibre 2.

Whilst a particular embodiment has been described it will be understood that modifications can be made without departing from the scope of the invention as defined by the appended claims. For example, instead of current switching a single linearly polarised laser source 3, outputs which vary as cos $\psi$ and sin $\psi$ may be generated in a time sequence by using two diode laser sources of wavelengths $\lambda_1$ and $\lambda_2$, respectively, which are alternately switched above threshold by the processing electronics. Equal levels of linearly polarised light from each source are then alternately launched into the lead fibre 1 so as to excite only one of its eigen modes, as in the embodiment particularly described.

We claim:
1. Optical fibre sensing apparatus characterised by:
   (a) an optical fibre lead (1) spliced to a shorter optical sensing fibre (2),
   (b) said lead and sensing fibres (1,2) comprising birefringent optical fibres having substantially orthogonal eigen modes (13,16 and 14,15) and being spliced together with their eigen modes mutually rotated by substantially 45°,
   (c) a reflective surface disposed at the distal end (6) of the sensing fibre,
   (d) light source means (3) for propagating linearly polarised incident light along one of the eigen modes (13) of the lead fibre (1), whereby light beams are propagated along both eigen mdoes of the sensing fibre (2) and are reflected from the distal end (6) of the sensing fibre to propagate return light beams along both eigen modes (13,16) of the lead fibre,
   (e) recovery means (7,8) for recovering one of the returning light beams from the lead fibre and producing an electrical signal corresponding to modal birefringence of the sensing fibre, and
   (f) means (9) for processing the electrical signal and producing an output signal corresponding to the polarisation mode delay of the sensing fibre.

2. Apparatus according to claim 1, characterised in that the light source means (3) is arranged to launch incident light into the proximal end of the lead fibre (1) and the recovery means comprises a beam splitter (7) disposed between the light source means and the proximal end of the lead fibre and arranged to reflect one of the returning light beams onto photoelectric sensing means (8).

3. Apparatus according to claim 1, characterised in that the recovery means (7,8) recovers, from the lead fibre, the light returning via the eigen mode (16) of the lead fibre (1) not used for transmitting the incident light.

4. Apparatus according to claim 1, characterised in that the light source means (3) is adapted alternately to launch into the selected eigen mode (13) of the lead fibre (1) two light beams of different wavelengths.

5. Apparatus according to claim 4, characterised in that the processing means (9) comprises a heterodyne system which produces an output carrier signal (10), the relative phase of which is related to the polarisation mode phase delay (4) of the sensing fibre.

6. Apparatus according to claim 5, characterised in that the heterodyne system comprises:
   (a) means for nulling DC components of the output signals from the photosensing means (8) to produce signals in terms of sin $\psi$ and cos $\psi$,
   (b) means for multiplying the latter signals by quadrature components of an oscillator, thereby yielding signals of the form sin $\Omega_c t$ cos $\psi$ and cos $\Omega_c t$ sin $\psi$, and
   (c) means for differentially combining the signals yielded by the means of sub-paragraph (b) to produce an output signal (10) which represents a carrier of constant amplitude and relative phase equal to the polarisation mode delay of the sensing fibre (2).

7. Apparatus according to claim 6, characterised by demodulation means for demodulating the output signal (10) to produce both the instantaneous value of any AC modal phase components and the total DC modal phase excursion of the sensing fibre (2).

* * * * *